United States Patent
Adachi

(10) Patent No.: US 10,354,688 B1
(45) Date of Patent: Jul. 16, 2019

(54) INFORMATION RECORDING MEDIUM AND METHOD FOR REPRODUCING THE SAME

(71) Applicant: Sharp Kabushiki Kaisha, Sakai, Osaka (JP)

(72) Inventor: Yoshihisa Adachi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/296,362

(22) Filed: Mar. 8, 2019

Related U.S. Application Data

(63) Continuation of application No. 16/008,078, filed on Jun. 14, 2018, now Pat. No. 10,304,487, which is a continuation of application No. 15/822,646, filed on Nov. 27, 2017, now Pat. No. 10,037,776, which is a continuation of application No. 15/478,259, filed on Apr. 4, 2017, now Pat. No. 9,865,295, which is a continuation of application No. 15/204,028, filed on Jul. 7, 2016, now Pat. No. 9,653,106, which is a continuation of application No. 14/894,619, filed as application No. PCT/JP2014/055466 on Mar. 4, 2014, now Pat. No. 9,424,874.

(30) Foreign Application Priority Data

Jun. 14, 2013 (JP) .................... 2013-125931

(51) Int. Cl.
| | | |
|---|---|---|
| G11B 7/24 | (2013.01) | |
| G11B 7/007 | (2006.01) | |
| G11B 27/32 | (2006.01) | |
| G11B 7/24085 | (2013.01) | |
| G11B 20/12 | (2006.01) | |
| G11B 7/005 | (2006.01) | |
| G11B 20/10 | (2006.01) | |

(52) U.S. Cl.
CPC .......... *G11B 7/00736* (2013.01); *G11B 7/005* (2013.01); *G11B 7/0079* (2013.01); *G11B 7/24085* (2013.01); *G11B 20/10* (2013.01); *G11B 20/1217* (2013.01); *G11B 27/32* (2013.01); *G11B 27/329* (2013.01)

(58) Field of Classification Search
None
See application file for complete search history.

(56) References Cited

U.S. PATENT DOCUMENTS

| | | | |
|---|---|---|---|
| 6,938,162 B1 * | 8/2005 | Nagai | G11B 7/00736 369/272.1 |
| 9,424,874 B2 * | 8/2016 | Adachi | G11B 7/005 |
| 9,653,106 B2 * | 5/2017 | Adachi | G11B 7/005 |
| 9,865,295 B2 * | 1/2018 | Adachi | G11B 7/005 |

(Continued)

OTHER PUBLICATIONS

Adachi, "Information Recording Medium and Method for Reproducing the Same", U.S. Appl. No. 16/008,078, filed Jun. 14, 2018.

*Primary Examiner* — Peter Vincent Agustin
(74) *Attorney, Agent, or Firm* — Keating & Bennett, LLP

(57) ABSTRACT

An information recording medium (10) including a first region (11) in which medium identification information has been recorded, a data region (13), and a second region (12) which is positioned between the first region (11) and the data region (13) and in which control information has been recorded, in which an area of the first region (11) is greater than an area of the second region (12) in size.

2 Claims, 7 Drawing Sheets

(56) References Cited

U.S. PATENT DOCUMENTS

| | | | |
|---|---|---|---|
| 10,037,776 B2* | 7/2018 | Adachi | G11B 7/005 |
| 2002/0021637 A1* | 2/2002 | Iida | G11B 7/0037 |
| | | | 369/47.39 |
| 2008/0175138 A1* | 7/2008 | Miyagawa | G11B 7/00736 |
| | | | 369/275.4 |
| 2009/0175155 A1* | 7/2009 | Nakata | G11B 7/005 |
| | | | 369/275.3 |
| 2016/0125907 A1* | 5/2016 | Adachi | G11B 7/005 |
| | | | 369/52.1 |
| 2017/0025142 A1* | 1/2017 | Adachi | G11B 7/005 |
| 2017/0229142 A1* | 8/2017 | Adachi | G11B 7/005 |
| 2018/0082711 A1* | 3/2018 | Adachi | G11B 7/005 |
| 2018/0294008 A1* | 10/2018 | Adachi | G11B 7/005 |

* cited by examiner

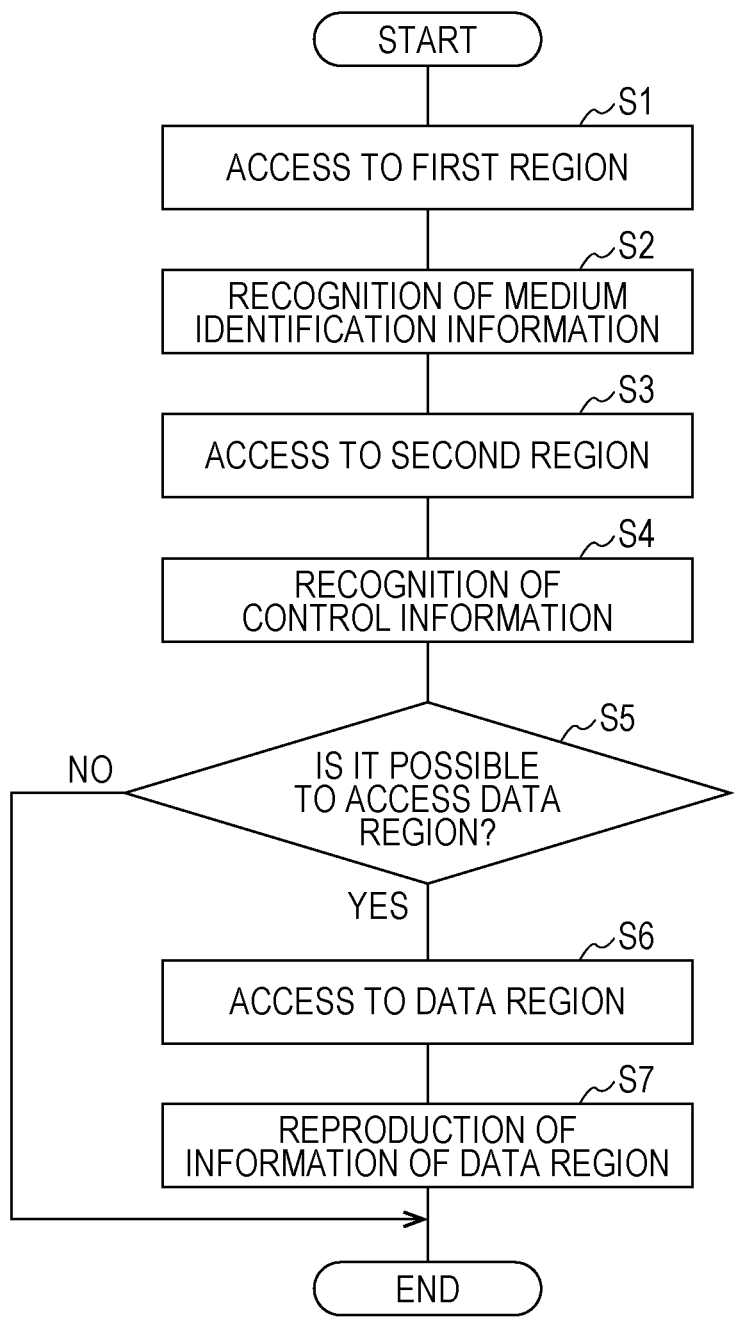

INFORMATION RECORDING MEDIUM AND METHOD FOR REPRODUCING THE SAME

TECHNICAL FIELD

The present invention relates to an information recording medium capable of recording any data and a method for reproducing the same.

BACKGROUND ART

An information recording medium such as an optical disc has a first region (PIC (=permanent information & control data) region) in which medium identification information indicating a structure of the information recording medium and the like is recorded, a data region (user region) in which any user data such as an image, a moving image and the like can be recorded, and a second region which is positioned between the first region and the data region and in which control information for performing access control (PAC (=physical-access control)) of an apparatus to a region on the information recording medium is recorded.

In recent years, for massive information processing of images, moving images and the like, a large-capacity of the information recording medium has been demanded. If the large capacity is achieved without changing a standard size (diameter of the optical disc) of the information recording medium, it is desired to increase a recording line density of the information recording medium, particularly, of the data region.

CITATION LIST

Patent Literature

PTL 1: International Publication No. 2007/100139 (published on Sep. 7, 2007)

SUMMARY OF INVENTION

Technical Problem

A recording reproducing apparatus of the information recording medium generally first accesses the first region in which medium identification information indicating a structure of the information recording medium and the like is recorded, reads the medium identification information, and then recognizes the structure of the medium.

Here, even if the capacity of information recording medium is large, since information recorded in the first region is the medium identification information indicating the structure of the information recording medium and the like, a data amount is almost the same as that before the capacity of the information recording medium is increased. On the other hand, a data amount of the data region capable of recording any user data such as the image, the moving image and the like is increased in accordance with increase in the capacity. Furthermore, a data amount of the second region which is positioned between the first region and the data region, and in which control information for access control of the apparatus to a region on the information recording medium is recorded is increased in accordance with increase in the capacity.

Thus, if an area of each region is determined according to a ratio of the data amount that is recorded in each region of the first region, the second region and the data region without changing the diameter of the optical disc, the area of the first region of a large-capacity information recording medium is decreased compared to a small-capacity information recording medium. For example, if the recording reproducing apparatus of the information recording medium accesses a certain position, since there is no strict access accuracy even if a desired radial position is specified, the recording reproducing apparatus has to check address information of the accessed position, moves to and accesses the desired position based on read address information. Thus, as a result of the decrease in the area of the first region, the recording reproducing apparatus of the information recording medium is difficult to access the first region, it takes time for the recognizing process of the structure of the medium, the number of retries of the recognizing process is increased, and recognition of the medium becomes difficult.

The present invention is made in view of the problem described above and realizes the information recording medium in which a recording reproducing apparatus of the information recording medium can easily perform a recognizing process of a structure of the medium and a method for reproducing the same.

Solution to Problem

In order to solve the problem described above, an information recording medium according to an aspect of the invention is an information recording medium including a first region that includes medium identification information indicating a structure of the information recording medium; a second region that includes control information indicating whether or not an apparatus can access a region on the information recording medium; and a data region in which any information can be recorded, in which an area of the first region is greater than an area of the second region.

Advantageous Effects of Invention

According to an aspect of the invention, an effect that the recording reproducing apparatus of the information recording medium can easily perform the recognizing process of the structure of the medium is achieved.

BRIEF DESCRIPTION OF DRAWINGS

FIG. 12 is a flowchart illustrating an example of a reproducing process of the information recording medium by the reproducing apparatus.

DESCRIPTION OF EMBODIMENTS

First Embodiment

A first embodiment of this invention is described with reference to FIGS. 1 to 3 as follows.
[Configuration of Information Recording Medium]

A configuration of an information recording medium according to the embodiment will be described with reference to FIGS. 1 and 2. FIG. 1 is a view illustrating an example of an appearance of an information recording medium 10. FIG. 2 is a view illustrating an example of a cross section structure corresponding to a radius of the information recording medium 10. As illustrated in FIG. 1, the information recording medium 10 is a disc-shaped optical disc having an opening section at a center and is, for example, an optical disc such as a Blu-ray (registered trademark) disc (BD).

Figure 1:
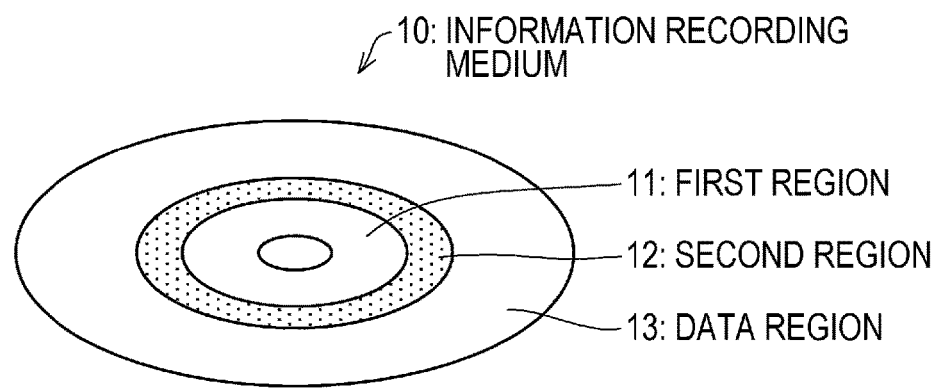
FIG. 1 is a view illustrating a first embodiment of the invention and illustrating an example of an appearance of an information recording medium.
Figure 2:
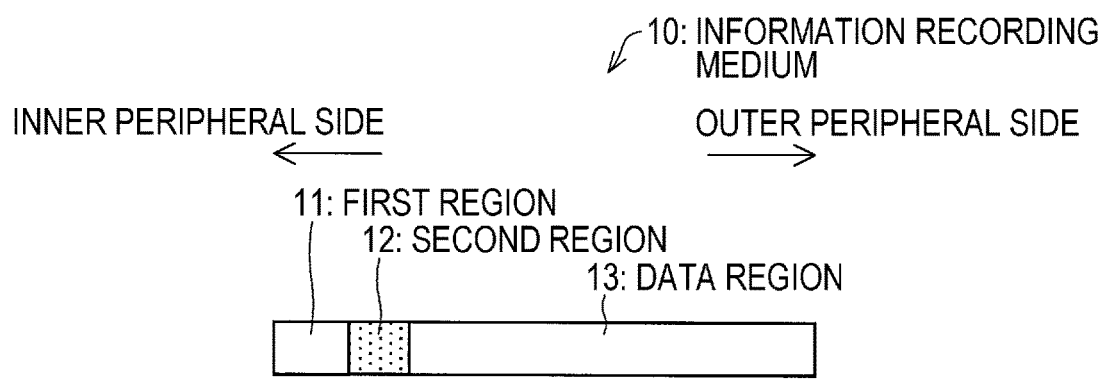
FIG. 2 is a view illustrating an example of a cross section structure corresponding to a radius of the information recording medium.

As illustrated in FIGS. 1 and 2, the information recording medium 10 has a first region (PIC region) 11 in which medium identification information indicating a structure of the information recording medium is recorded, a data region (user region) 13 in which any user data such as an image, a moving image and the like can be recorded or has been recorded, and a second region 12 in which control information for access control (PAC) of an optical disc apparatus to a region on the information recording medium and the like are recorded.

Moreover, the information recording medium 10 may be a recording type information recording medium where a user can read and write the user data of the data region 13 or may be a reproduction-dedicated type information recording medium where the user only can read the user data of the data region 13.

Here, the optical disc apparatus is the recording reproducing apparatus that performs reproduction of information recorded in the information recording medium 10 and/or recording information to the data region 13.

Furthermore, the first region 11 is positioned on the innermost circumference side of the information recording medium 10 and the data region 13 is positioned on the outermost circumference side of the information recording medium 10 in a radial direction of the disc. The second region 12 is positioned between the first region 11 and the data region 13. That is, the first region 11, the second region 12, and the data region 13 are disposed in order from the inner peripheral side to the outer peripheral side in the information recording medium 10. However, a positional relationship of each region is not limited to the embodiment and any positional relationship is fine as long as the second region 12 is disposed between the first region 11 and the data region 13.

As described above, in a case of achieving a large capacity of the information recording medium 10 without changing a size thereof, a recording line density of the data region 13 is increased. Then, in the information recording medium 10 according to the invention, a recordable data amount (recording capacity) is increased by increasing the recording line density of the data region 13. Furthermore, a recording line density of the second region 12 is also increased. Furthermore, in the information recording medium 10 according to the embodiment, the recording line densities of the second region 12 and the data region 13 are equal. However, the invention is not limited to the embodiment and the recording line densities of the second region 12 and the data region 13 may be different from each other. As described below, any density is fine as long as the recording line densities of the second region 12 and the data region 13 are higher than the recording line density of the first region 11.

Here, in the information recording medium 10 according to the invention, an area of the first region 11 is greater than an area of the second region 12 in size. If the optical disc apparatus of the information recording medium 10 accesses the first region 11, since there is no strict access accuracy even if a desired radial position is specified, the optical disc apparatus may erroneously access the second region 12 disposed between the first region 11 and the data region 13. Thus, there are problems that a time desired for a recognizing process of a structure of the medium is increased, the number of retries of the recognizing process is increased, and the recognition of the medium becomes difficult. However, it is possible to easily perform access of the recording reproducing apparatus of the information recording medium 10 to the first region and the recognition of the medium identification information by ensuring the area of the first region 11 to be greater than that of the second region 12 in size. Each region is specified from a start radial position to an end radial position (start radial position of an adjacent region) by a standard. The area of each region can be calculated from the start radial position and the end radial position.

Moreover, for example, the large-capacity information recording medium is a BD of which a recording capacity per layer is 33 GB and the small-capacity information recording medium is a BD of which a recording capacity per layer is 25 GB.

The optical disc apparatus for the large-capacity information recording medium is the optical disc apparatus capable of reproducing information recorded at a high recording line density and recording at the high recording line density. Furthermore, the optical disc apparatus for the large-capacity information recording medium also can reproduce information at a low recording line density and record information at the low recording line density. In addition, the optical disc apparatus for the small-capacity information recording medium is the optical disc apparatus capable of reproducing information at the low recording line density and recording information at the low recording line density. Since the optical disc apparatus for the small-capacity information recording medium is not designed to perform reproduction of information recorded at the high recording line density and recording information at the high recording line density, a reproduction speed of the optical disc apparatus for the small-capacity information recording medium is unable to be changed to a reproduction speed desired for performing reproduction of information recorded at the high recording line density and recording information at the high recording line density. Thus, it is difficult or unable to reproduce information recorded at the high recording line density and record information at the high recording line density.

Furthermore, in the information recording medium 10 according to the invention, the recording line density of the first region 11 is lower than the recording line density of the second region 12. Thus, even if the information recording medium 10 is inserted into the optical disc apparatus for the small-capacity information recording medium in which a data amount that can be recorded from the information recording medium 10 is small, the recording line density of the first region 11 is low, that is, is equal to the recording line density of the small-capacity information recording medium, or recording is performed at a near recording line density. Thus, the medium identification information can be easily read. Thus, it is possible to suppress a drawback that the optical disc apparatus repeats retry of the recognizing process or the optical disc apparatus freezes. Then, if the information recording medium 10 can be recognized as the large-capacity information recording medium and the optical disc apparatus is unable to deal with reproduction of information recorded at the high recording line density and recording at the high recording line density by reading the medium identification information, it is possible to present to the user without taking time that the information recording medium 10 is a non-compliant optical disc. Moreover, a discharging process of the information recording medium 10 may be performed from the optical disc apparatus in addition to the presentation to the user. Furthermore, only the discharging process of the information recording medium 10 may be performed.

Moreover, the medium identification information includes information indicating the recording line densities of the second region and the data region 13. Furthermore, the medium identification information may include reference address information indicating a reference address of each region. The reference address includes either or both a first address and a last address of the region.

If the medium identification information includes information indicating the recording line densities of the second region 12 and the data region 13, the optical disc apparatus for the large-capacity information recording medium reads the medium identification information and then can quickly perform setting of the recording line density for accessing the second region 12 and the data region 13.

On the other hand, since information indicating the recording line densities of the second region 12 and the data region 13 are equal to the recording line density of the small-capacity information recording medium or recording is performed at the near recording line density, the optical disc apparatus for the small-capacity information recording medium easily reads the medium identification information. As a result of reading, the information recording medium 10 can quickly recognizes that the optical disc apparatus for the small-capacity information recording medium is unable to comply with reproduction and recording of information.

Moreover, plural pieces of the same medium identification information may be recorded in the first region 11. Thus, for reading of the medium identification information, even if a piece of the medium identification information is affected by scratches, dirt, and the like, it is possible to easily avoid the influence of scratches, dirt, and the like by reading another piece of the medium identification information.

Furthermore, if the medium identification information includes the reference address information indicating the reference address of each region, the optical disc apparatus for the large-capacity information recording medium reads the medium identification information and then can quickly perform specification of the address for accessing the second region 12 and the data region 13, and easily accesses each region.

The information recording medium 10 may have a plurality of first regions 11 and, for example, the first regions 11 may be disposed on the innermost circumference side and the outermost circumference side of the information recording medium 10. In this case, the first region, the second region, the data region, the second region, and the first region are disposed from the innermost circumference side to the outermost circumference side.

Furthermore, in the information recording medium 10, the number of tracks of the first region 11 may be greater than the number of tracks of the second region 12.

A length from the start radial position to the end radial position (start radial position of adjacent region) of each region is specified by a standard. The number of tracks is the number of tracks across a straight line between the start radial position and the end radial position of each region in the radial direction and can be calculated by dividing the distance between the start radial position and the end radial position of each region in the radial direction into a track pitch (distance between adjacent tracks in the radial direction).

Even if the number of the tracks of the first region 11 is ensured to be greater than the number of the tracks of the second region 12, similar to a case where the area of the first region 11 is ensured to be greater than that of the second region 12, the recording reproducing apparatus of the information recording medium 10 can easily perform access to the first region and the recognition of the medium identification information.

Furthermore, in the information recording medium 10, the area of the first region 11 is made to be greater than the area of the second region and simultaneously the number of the tracks of the first region 11 may be greater than the number of the tracks of the second region 12.

Figure 3A:
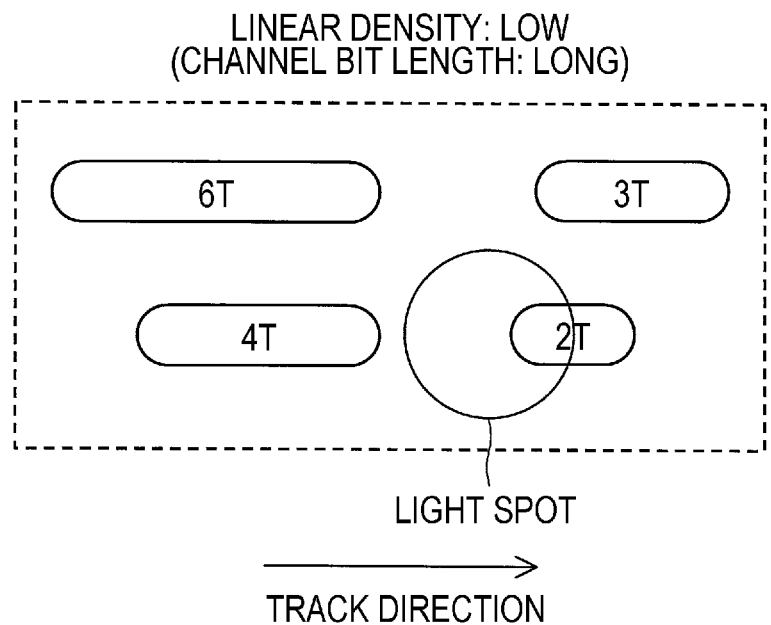
FIG. 3($a$) is a diagram illustrating an example of a pit length of a pit in a first region of the information recording medium and FIG. 3($b$) is a diagram illustrating an example of a pit length of a pit in a second region of the information recording medium.

Next, a further detailed configuration of the information recording medium 10 will be described with reference to FIGS. 3(a) and 3(b). Here, a case where the information recording medium 10 is a reproduction-dedicated disc is described as an example. FIG. 3(a) is a diagram illustrating an example of a pit length of a pit in the first region and FIG. 3(b) is a diagram illustrating an example of a pit length of a pit in the second region.

Figure 3B:
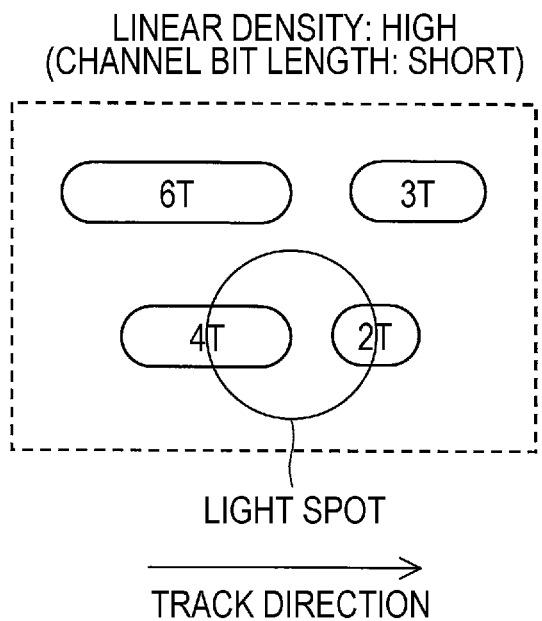

If unit bit length corresponding to one channel clock period synchronized for reproduction is T, as illustrated in FIGS. 3(a) and 3(b), pits having integral multiple of T of bit lengths of 2T, 3T, 4T, and 6T, and spaces between the pit and the pit are present in each region. Here, "recording line density of the second region 12 is higher than that of the first region 11" means that the channel clock periods of the first region 11 and the second region 12 are the same, the reproduction speed of a reference for reproducing the first region 11 is slower than the reproduction speed of a reference for reproducing the second region 12, and the unit bit length of the second region 12 is shorter than that of the first region 11. That is, the reproduction speeds for reproducing the first region 11 and the second region 12 can be changed by the apparatus in accordance with the region.

Second Embodiment

A second embodiment of the invention will be described with reference to FIG. 4 as follows. Moreover, for the sake of convenience of description, the same reference numerals are given to members having the same functions as the members illustrated in the first embodiment described above and description thereof will be omitted.

In an information recording medium 10 according to the second embodiment, plural pieces of the same control information are recorded in a second region 12. Control information may be written on two or more positions and, for example, as illustrated in FIG. 4, control information 121 and 122 may be recorded in a beginning and an end of the second region 12 respectively. Control information 121 and 122 are information having the same contents.

As described above, control information for access control (PAC) of the optical disc apparatus to a region on the information recording medium 10 is included in the second region. Thus, the optical disc apparatus can recognize whether or not access is performed by recognizing control information of the second region.

Here, scratches and dirt are attached to the information recording medium and thereby a portion in which control information is recorded is unable to be read. If control information is unable to be read, the optical disc apparatus is unable to access a data region 13 and reading and writing to the information recording medium I unable to be performed.

Here, as the information recording medium 10 according to the second embodiment, it is possible to improve durability of the information recording medium by recording control information within the second region more than once.

Figure 4:
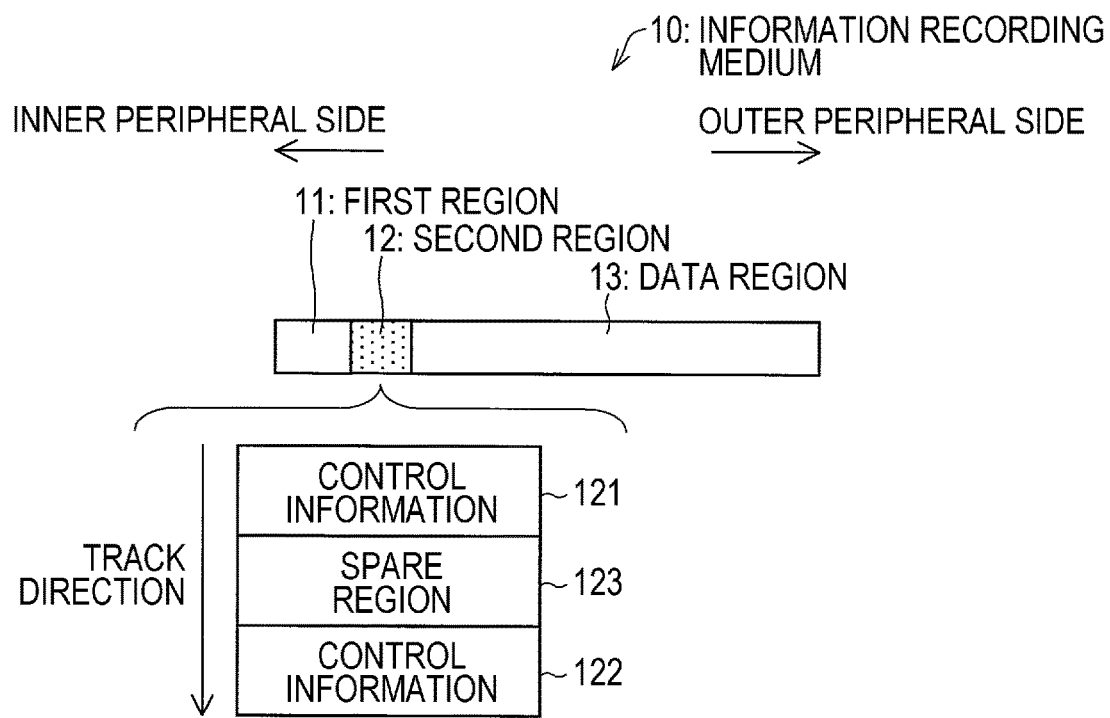
FIG. 4 is a view illustrating an example of a cross section structure corresponding to a radius of an information recording medium according to a second embodiment of the invention.

Furthermore, as illustrated in FIG. 4, it is preferable that the second region 12 has a spare region 123 for using in a future standard extension of the information recording medium 10. That is, it is preferable that the second region 12 has an empty region capable of recording information other than control information.

As described above, it is preferable that a plurality pieces of control information are present at a distance so as not to receive influence of scratches, dirt, and the like. Thus, it is preferable that the spare region 123 is positioned between positions in which control information is recorded.

It is preferable that a recording capacity of the second region is larger than a recording capacity (data amount of the medium identification information recorded in the first region) of the first region such that plural pieces of control information can be recorded and the spare region 123 can be provided.

Third Embodiment

A third embodiment of the invention will be described with reference to FIGS. 5 to 7 as follows. Moreover, for the sake of convenience of description, the same reference numerals are given to members having the same functions as the members illustrated in the first embodiment described above and description thereof will be omitted.

Figure 5:
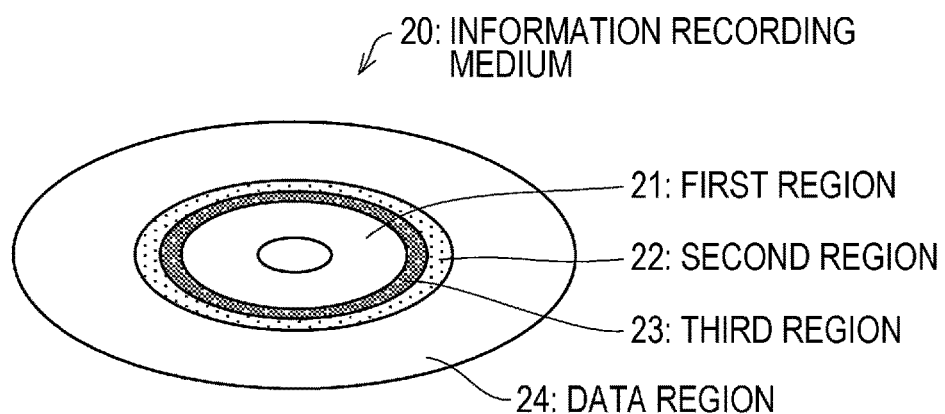
FIG. 5 is a view illustrating an example of an appearance of an information recording medium according to a third embodiment of the invention.
Figure 6:
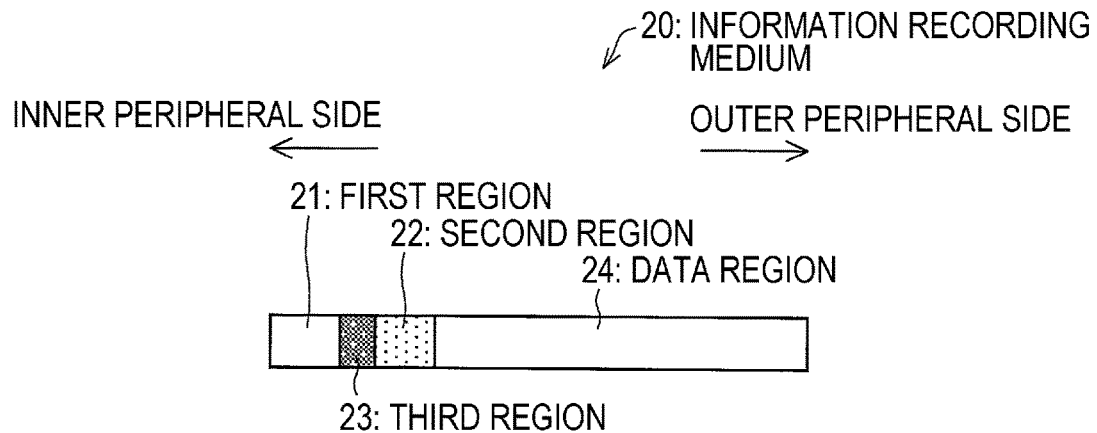
FIG. 6 is a view illustrating an example of a cross section structure corresponding to a radius of the information recording medium.
Figure 7:
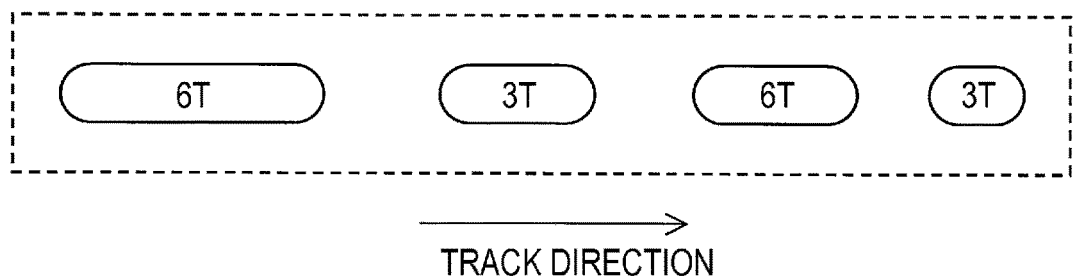
FIG. 7 is a diagram illustrating an example of a pit length of a pit in a third region of the information recording medium.

As illustrated in FIGS. 5 and 6, an information recording medium 20 according to the third embodiment has a third region 23 for further changing the line density in addition to a first region 21, a second region 22, and a data region 24 different from the first embodiment. The first region 21, the third region 23, the second region 22, the data region 24 are sequentially disposed from an inner peripheral side to an outer peripheral side in the information recording medium 20. However, a positional relationship of each region is not limited to the embodiment and is freely set.

The third region 23 is positioned between the first region 21 and the second region 22 and is a region for changing a pit length from a low recording line density to a high recording line density. An example of the pit length of the pit in the third region 23 is illustrated in FIG. 7. As illustrated in the view, in the third region 23, a channel bit length becomes shorter as advancing in a track direction.

The optical disc apparatus can easily performs switching of the reproduction speed corresponding to the recording line density by providing the third region 23 that is positioned between the first region 21 and the second region 22, and changes the pit length from the low recording line density to the high recording line density.

It is preferable that an area of the third region 23 is smaller than an area of the first region 21. Thus, access the first region 21 and recognition of the medium identification information are easily performed.

Furthermore, it is preferable that the second region 22 is positioned between the third region 23 and the data region 24. Thus, after the reproduction speed is changed to a reproduction speed corresponding to the high recording line density in the third region 23, it is possible to reproduce the second region 22 and the data region 24 in order with the recording line density as it is, and a processing burden by the change in the line density of the optical disc apparatus is avoided.

Moreover, also in the information recording medium 20 according to the third embodiment, as illustrated in the second embodiment, plural pieces of control information may be recorded in the second region 22.

Fourth Embodiment

Figure 8:
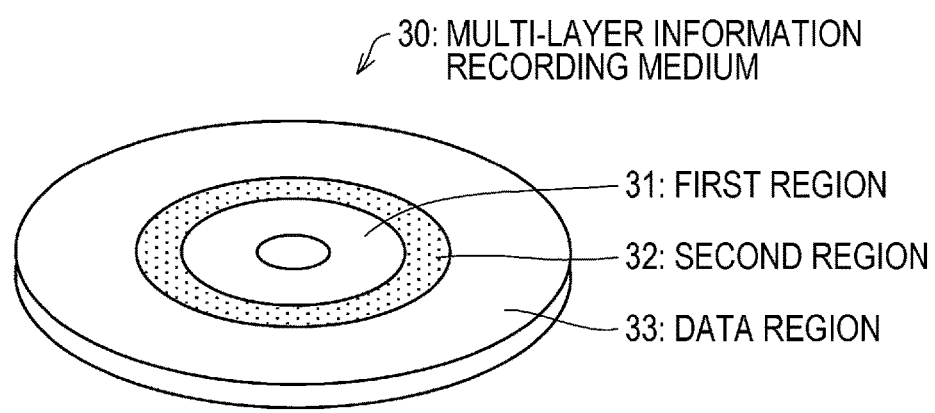
FIG. 8 is a view illustrating an example of an appearance of an information recording medium according to a fourth embodiment of the invention.

A fourth embodiment of the invention will be described with reference to FIGS. 8 to 10 as follows. Moreover, for the sake of convenience of description, the same reference numerals are given to members having the same functions as the members illustrated in the first embodiment described above and description thereof will be omitted.

An information recording medium 30 according to the fourth embodiment has a plurality of recording layers different from the first embodiment. Other configurations are the same as those of the first embodiment. As illustrated in FIG. 8, the information recording medium 30 has a first region 31, a second region 32, and a data region 33.

Figure 9:
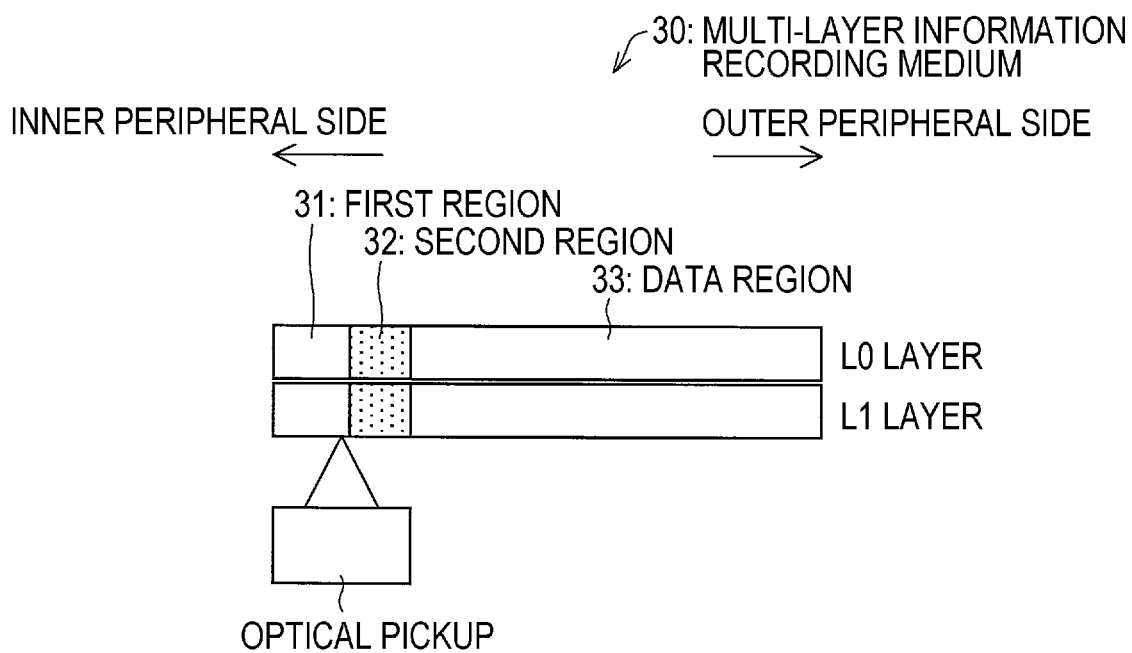
FIG. 9 is a view illustrating an example of a cross section structure corresponding to a radius of the information recording medium.
Figure 10:
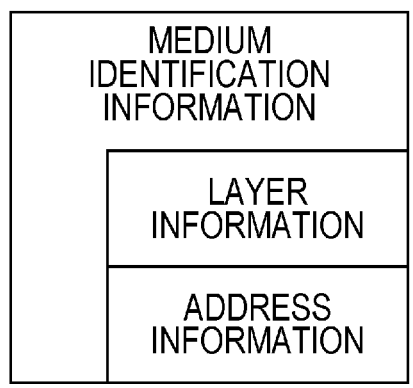
FIG. 10 is a diagram illustrating an example of medium identification information of the information recording medium.

For example, as illustrated in FIG. 9, the information recording medium 30 may have recording layers of two layers (L0 layer and L1 layer). In this case, as illustrated in FIG. 10, the medium identification information recorded in the first region 31 includes layer information indicating the number of the recording layers of the information recording medium 30 and a reference address information indicating the reference address of each region. The reference address includes each recording layer and one or both a first address or a last address of each region within the recording layer.

Moreover, the medium identification information may be recorded in each recording layer or in one recording layer. If the medium identification information is recorded in each recording layer, it is possible to recognize the medium identification information even if the optical disc apparatus accesses any recording layer.

If the information recording medium 30 has a plurality of recording layers and layer information is recorded in the medium identification information, for the optical disc apparatus, it is possible to easily interlayer-move to the recording layer in which desired information is recorded by recognizing the medium identification information.

Furthermore, if the reference address information indicating the reference address of the second region 32 and/or the data region 33 is recorded in the medium identification information, the optical disc apparatus can easily move to the address in which desired information is recorded in the second region 32 and the data region 33 by recognizing the information.

Moreover, also in the information recording medium 30 according to the fourth embodiment, as illustrated in the second embodiment, plural pieces of control information may be recorded in the second region 32. Furthermore, as illustrated in the third embodiment, the information recording medium 30 according to the fourth embodiment also may have a third region.

Fifth Embodiment

A fifth embodiment will be described with reference to FIGS. 11 and 12 for an optical disc apparatus performing recording and reproducing the information recording medium according to the invention.

(Configuration of Optical Disc Apparatus)

First, a configuration of an optical disc apparatus 40 according to a fifth embodiment will be described with reference to FIG. 11. The optical disc apparatus 40 is an apparatus performing reproduction of the large-capacity information recording medium such as the information recording media 10, 20, 30, and the like. That is, the optical disc apparatus 40 is an optical disc apparatus for the large-capacity information recording medium.

Figure 11:
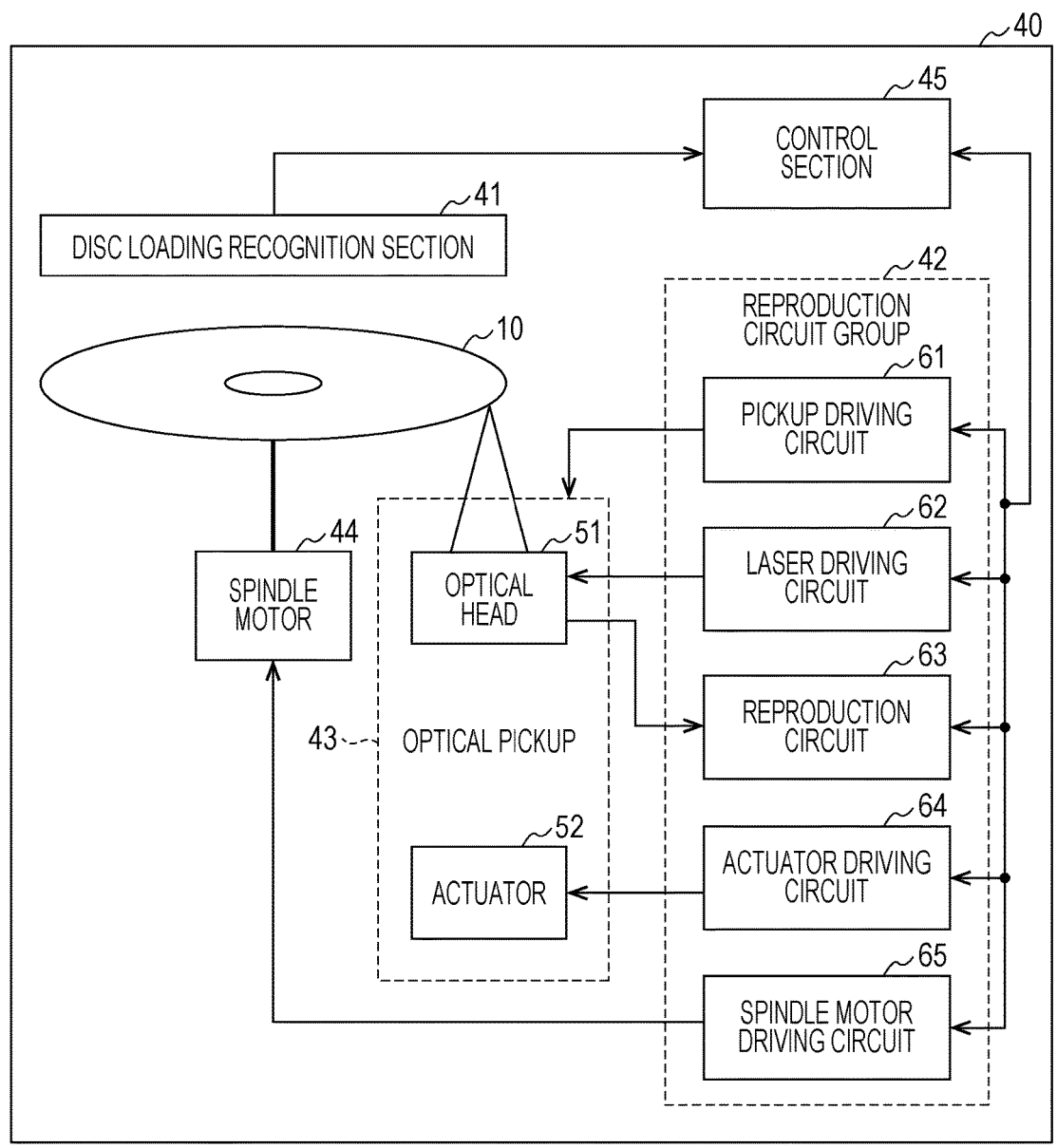
FIG. 11 is a block diagram illustrating an example of a configuration of an essential part of a reproducing apparatus reproducing the information recording medium according to the invention.

FIG. 11 is a block diagram of a function illustrating a schematic configuration of the optical disc apparatus 40. As illustrated in FIG. 11, the optical disc apparatus 40 mainly includes a disc loading recognition section 41, a reproduction circuit group 42, an optical pickup 43, a spindle motor 44, and a control section 45.

The optical pickup 43 further includes an optical head 51 and an actuator 52.

Furthermore, the reproduction circuit group 42 further includes a pickup driving circuit 61, a laser driving circuit 62, a reproduction circuit 63, an actuator driving circuit 64, and a spindle motor driving circuit 65.

The disc loading recognition section 41 is provided to detect loading and discharging of the information recording medium 10 and the like, and, for example, various sensors can be exemplified, but any sensor may be used as long as loading and discharging of the information recording medium 10 and the like can be detected.

The pickup driving circuit 61 is provided to drive the optical pickup 43. The laser driving circuit 62 is provided to control the optical head 51. The reproduction circuit 63 is provided to convert reproduction light obtained from the optical head 51 into a reproduction signal. The actuator driving circuit 64 is provided to drive an actuator. The spindle motor driving circuit 65 is provided to drive a spindle motor.

The optical head 51 irradiates the information recording medium 10 with laser light and outputs the reproduction light obtained by being reflected from the information recording medium 10 to the reproduction circuit 63. The actuator 52 is provided to move the optical head 51.

The spindle motor 44 is provided to rotate the information recording medium 10.

The control section 45 is provided to collectively control each section provided in the optical disc apparatus 40, particularly, each section of the reproduction circuit group 42.

(Reproducing Process of Optical Disc Apparatus)

A reproducing process performed by the optical disc apparatus 40 will be described with reference to FIG. 12. FIG. 12 is a flowchart illustrating an example of the reproducing process performed by the optical disc apparatus 40. Here, a process of reproducing the information recording medium 10 by the optical disc apparatus 40 will be described.

As illustrated in FIG. 12, first, the spindle motor 44 is set to be a reproduction speed according to the recording line density of the first region 11. Then, the optical head 51 is accessed to the first region 11 by driving the optical pickup and the actuator (S1). The optical head 51 obtains the reproduction light from the first region 11 and the control section 45 recognizes the medium identification information of the first region based on the reproduction signal from the reproduction circuit 63 (S2: medium recognition step). Thus, the control section 45 recognizes that the recording line densities of the second region 12 and the data region 13 are high.

Next, the reproduction speed is set to be the reproduction speed according to the recording line density of the second region 12 and the optical head 51 is accessed to the second region 12 (S3). The control section 45 recognizes control information of the second region 12 (S4: reproducing step). Then, the control section 45 determines whether or not it is possible to access the data region 13 based on control information (S5).

If it is possible to access the data region 13, the optical head 51 accesses the data region 13 (S6) and information (user data) of the data region is reproduced (S7: reproducing step). On the other hand, if it is not possible to access the data region 13, the reproducing process is completed. The optical disc apparatus 40 informs the user of the completion of the reproducing process by performing a display of an error message on a display section.

In the information recording medium 10, since the area of the first region 11 is larger than the second region 12 disposed between the first region 11 and the data region 13, access the first region 11 is easily performed by the optical disc apparatus 40 and the recognition of the medium identification information recorded in the first region 11 is easily performed.

Furthermore, since the second region 12 is disposed between the first region 11 and the data region 13, the optical disc apparatus can perform the recognition of the medium identification information of the first region 11, setting of the reproduction speed according to the recording line density of the second region 12 by the recognition, the recognition of control information of the second region 12, the determination whether or not it is possible to access the data region 13 by the recognition, and access the data region 13 in order in the radial direction of the optical disc.

Moreover, control information of the second region 12 may be information for determining whether or not it is possible to access the entire data region 13 or may be information for determining whether or not it is possible to access a specific region in the data region 13. Furthermore, control information of the second region 12 may include information for determining whether or not it is possible to access a specific region other than the data region 13.

If the optical disc apparatus 40 recognizes the medium identification information of the first region 11, it is possible to recognize which recording line density of the second region 12 and the data region 13 is higher. Thus, the reproduction speed can be set according to the recording line density and it is possible to accurately reproduce information of the regions.

Furthermore, if the information recording medium 10 is configured of a plurality of layers and layer information is recorded in the medium identification information, in S6, the optical head 51 interlayer-moves to the layer in which information of the second region and/or information of the data region are recorded based on the layer information.

Furthermore, if reference address information indicating the reference address of the second region and/or the data region is recorded in the medium identification information, in S6, the optical head 51 moves to the address in which information of the second region and/or information of the data region are recorded based on the reference address information.

Moreover, a case where the reproducing apparatus for the small-capacity information recording medium reproduces the information recording medium 10 will be also described. In this case, since the medium identification information is recorded in the first region 11 at the low recording line density, it is possible to recognize the medium identification information also in the reproducing apparatus for the small-capacity information recording medium. Then, the reproducing apparatus for the small-capacity information recording medium recognizes the recording line density of the second region 12 and the data region based on the medium identification information. Here, since the reproducing apparatus for the small-capacity information recording medium corresponds to the recording line density of the second region 12 and the data region, it is determined that the information recording medium 10 is unable to be reproduced and the reproducing process is completed.

SUMMARY

The information recording medium according to a first aspect of the invention includes a first region that includes medium identification information indicating a structure of the information recording medium, a data region in which any user data can be recorded or has been recorded, and a second region that is positioned between the first region and the data region, and includes control information indicating whether or not an apparatus can access a region on the information recording medium, in which an area of the first region is greater than an area of the second region in size.

According to the configuration described above, even if the capacity of the information recording medium is made large, it is possible to sufficiently ensure the area of the first region, the optical disc apparatus accesses the first region, and then a possibility to erroneously access the second region disposed between the first region and the data region is low. As a result, it is possible to reduce time for the recognizing process of the structure of the medium, to reduce an increase in the number of retries of the recognizing process, and to reduce incapability of the recognition of the medium. That is, the recording reproducing apparatus of the information recording medium can access the first region and can easily perform the recognition of the medium identification information.

In the information recording medium according to a second aspect of the invention, according to the first aspect described above, a recording capacity of the second region may be greater than a recording capacity of the first region in size.

According to the configuration described above, it is possible to provide a spare region for a future extension in the second region by increasing the recording capacity of the second region.

In the information recording medium according to a third aspect of the invention, according to the first or second aspect described above, a recording line density of the first region may be lower than a recording line density of the second region.

According to the configuration described above, even if the recording reproducing apparatus is not compatible with the recording line density of the second region, it is possible to access the first region and to easily recognize the medium identification information. Thus, it is possible to suppress a drawback that the recording reproducing apparatus repeats retry of the recognizing process of the medium identification information or the recording reproducing apparatus freezes.

It is possible to increase the recording capacity of the second region by increasing the recording line density of the second region to be greater than the recording line density of the first region.

An information recording medium according to a fourth aspect of the invention includes a first region that includes medium identification information indicating a structure of the information recording medium, a data region in which user data can be recorded or has been recorded, and a second region which is positioned between the first region and the data region, and includes control information indicating whether or not an apparatus can access a region on the information recording medium in which the number of tracks of the first region is greater than the number of tracks of the second region.

According to the configuration described above, even if the capacity of the information recording medium is made large, it is possible to sufficiently ensure the number of tracks of the first region, the optical disc apparatus accesses the first region, and then a possibility to erroneously access the second region disposed between the first region and the data region is reduced. As a result, it is possible to reduce time for the recognizing process of the structure of the medium, to reduce the increase in the number of retries of the recognizing process, and to reduce incapability of the recognition of the medium. That is, the recording reproducing apparatus of the information recording medium can access the first region and can easily perform the recognition of the medium identification information.

In a method for reproducing information recording medium according to a fifth aspect of the invention, the method for reproducing the information recording medium according to any one of the aspects 1 to 4 described above may include a medium recognition step of recognizing medium identification information recorded in the first region, and a reproduction step of reproducing information recorded in the second region and/or the information recorded in the data region.

According to the configuration described above, the medium identification information of the first region is recognized and it is possible to access a desired position of the second region and/or the data region, and to easily access desired information that is recorded based on the information.

In the information recording medium according to a sixth aspect of the invention, according to the third aspect described above, the information recording medium may further include a third region, positioned between the first region and the second region, whose recording line density changing from the recording line density of the first region to the recording line density of the second region.

Since the recording line densities of the first region and the second region are different, the recording reproducing apparatus of the information recording medium is desired for switching the recording reproduction speed corresponding to the recording line density.

According to the configuration described above, the recording reproducing apparatus can easily perform switching of the reproduction speed corresponding to the recording line density by including the third region whose recording line density changing from the recording line density of the first region to the recording line density of the second region.

In the information recording medium according to a seventh aspect of the invention, according to any one of the first to fourth aspects described above, the medium identification information may include layer information indicating the number of layers of the information recording medium.

According to the configuration described above, the recording reproducing apparatus of the information recording medium can easily access the layer in which desired information is recorded.

In the information recording medium according to an eighth aspect of the invention, according to the second aspect described above, the second region may include a spare region for a future extension. That is, in the information recording medium according to the eighth aspect of the invention, according to the second aspect described above, the second region may include an empty region capable of recording information other than the control information.

According to the configuration described above, the second region 12 can ensure the spare region for using in a future standard extension of the information recording medium. Furthermore, plural pieces of control information can be present at a distance by positioning the spare region between portions in which the control information is recorded. Even if one piece of the control information is affected by scratches, dirt, and the like, an effect that the influence thereof to another piece of the control information can be easily avoided is achieved.

In the information recording medium according to a ninth aspect of the invention, according to the sixth aspect described above, an area of the third region may be smaller than that of the first region in size.

According to the configuration described above, it is possible to sufficiently ensure the area of the first region with respect to the third region and the recording reproducing apparatus of the information recording medium can easily perform the access to the first region and the recognition of the medium identification information.

In the information recording medium according to a tenth aspect of the invention, according to the sixth aspect described above, the second region may be adjacent to the third region and the data region.

According to the configuration described above, after the reproduction speed is changed to the reproduction speed corresponding to the high recording line density in the third region, it is possible to reproduce the second region and the data region in order at this recording line density, and a processing burden by the change in the line density of the optical disc apparatus is avoided.

In the information recording medium according to an eleventh aspect of the invention, according to any one of the first to fifth aspects described above, the medium identification information may include reference address information indicating a reference address of the second region and/or the data region.

According to the configuration described above, the optical disc apparatus reads the medium identification information and then can quickly perform designation of the address for accessing the second region and/or the data region, and easily accesses each region.

In the method for reproducing the information recording medium according to the twelfth aspect of the invention, according to the fifth aspect described above, the method may have a layer recognition step of recognizing layer information indicating the number of layers of the information recording medium from the information recording medium, an interlayer moving step of interlayer-moving between the layers in which the information of the second region and/or the information of the data region are recorded based on the layer information, and a reproduction step of reproducing the information of the second region and/or the information of the data region.

According to the configuration described above, the layer information indicating the number of layers of the information recording medium is recognized, it is possible to quickly access the second region and/or the data region of a desired layer, and it is possible to easily access desired recorded information based on the information. Moreover, the layer information may be included in the medium identification information of the first region. Furthermore, the medium identification information may also include the reference address information indicating the reference address of each region of each layer.

In the method for reproducing the information recording medium according to the thirteenth aspect, according to the fifth aspect described above, the method may have an address recognition step of recognizing reference address information indicating a reference address of the second region and/or the data region from the information recording medium, an address moving step of moving to the address in which the information of the second region and/or the information of the data region is recorded based on the reference address information, and a reproduction step of reproducing the information of the second region and/or the information of the data region.

According to the configuration described above, if the reference address information indicating the reference address of each region is included in the medium identification information, the optical disc apparatus reads the medium identification information, can quickly perform designation of the address for accessing the second region and the data region, and easily accesses each region.

The invention is not limited to each embodiment, may be variously altered within the scope of the claims, and embodiments obtained by appropriately combining technical means disclosed in different embodiments are included in the technical scope of the invention.

INDUSTRIAL APPLICABILITY

The invention can be used in the information recording medium such as the optical disc, the optical disc apparatus for reproducing the information recording medium, and the method for reproducing the information recording medium.

REFERENCE SIGNS LIST 10, 20, 30 information recording medium
11, 21, 31 first region 12, 22, 32 second region
13, 24, 33 data region
23 third region
40 optical disc apparatus (the reproducing apparatus)
123 spare region

The invention claimed is:

1. An information recording medium comprising:
a plurality of recording layers;
a first region that includes medium identification information indicating a structure of the information recording medium;
a data region in which user data can be recorded or has been recorded; and
a second region which is positioned between the first region and the data region, and includes control information indicating whether or not an apparatus can access a region on the information recording medium,
wherein an area of the first region is greater than an area of the second region in size,
the medium identification information includes layer information indicating a total number of the plurality of recording layers, and
the medium identification information is recorded in each of the plurality of recording layers.

2. A method for reproducing the information recording medium according to claim 1, the method comprising:
a medium recognition step of recognizing the medium identification information recorded in the first region; and
an interlayer moving step of interlayer-moving to any one of the plurality of recording layers in which desired information is recorded.

* * * * *